United States Patent

[11] 3,620,575

| [72] | Inventors | Donald J. McIver;<br>Russell D. McClaid, Jr., both of Houston, Tex. |
|---|---|---|
| [21] | Appl. No. | 855,655 |
| [22] | Filed | Sept. 5, 1969 |
| [45] | Patented | Nov. 16, 1971 |
| [73] | Assignee | Keystone Valve Corporation<br>Houston, Tex. |

[54] PARTICULATE-CONVEYING APPARATUS
4 Claims, 2 Drawing Figs.

[52] U.S. Cl. ............................................. 302/53, 302/59, 302/17
[51] Int. Cl. ............................................. B65g 53/40
[50] Field of Search ............................................. 302/53, 59, 17; 214/17, 83.28; 222/373; 243/2; 340/246

[56] References Cited
UNITED STATES PATENTS

| 2,116,603 | 5/1938 | Holly | 214/83.28 |
| 2,763,446 | 9/1956 | Hanson | 243/2 |
| 3,179,378 | 4/1965 | Zenz et al. | 302/53 X |
| 3,313,435 | 4/1967 | Welk | 214/17 X |
| 3,374,910 | 3/1968 | Hermanns | 302/53 X |
| 3,510,861 | 5/1970 | McIver et al. | 340/246 |
| 3,378,310 | 4/1968 | Christensen | 302/17 |
| 3,069,205 | 12/1962 | McIver et al. | 302/17 |
| 3,258,296 | 6/1966 | Von Funk | 302/27 |

*Primary Examiner*—Harvey C. Hornsby
*Assistant Examiner*—Merle F. Maffei
*Attorneys*—Murray Robinson and Ned L. Conley

ABSTRACT: A system for (1) removal of particulate material from a supply area or container and filling a storage vessel, and (2) for discharging such material from the storage vessel into a supply line. Changing from cycle No. 1 to cycle No. 2 is effected by virtue of a reversible motor.

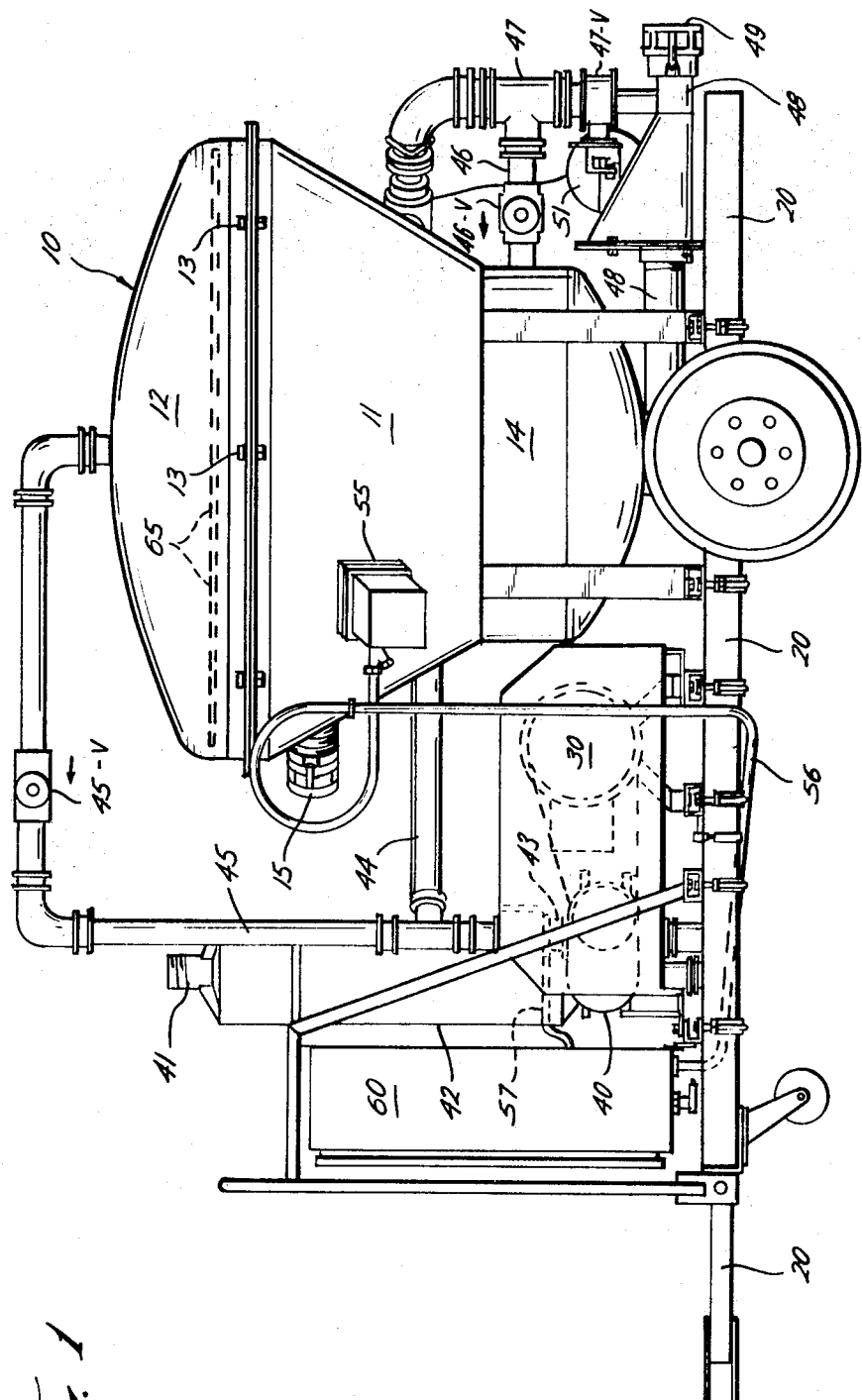

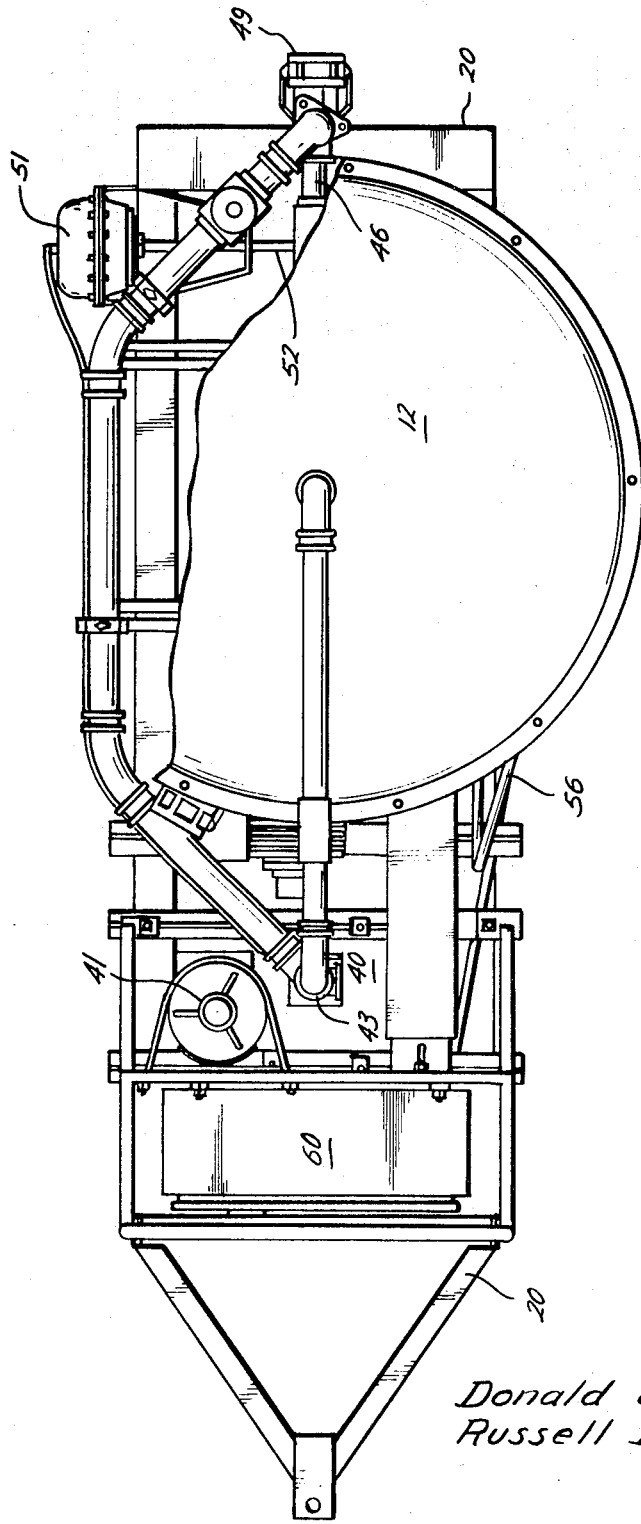

3,620,575

PARTICULATE-CONVEYING APPARATUS

BACKGROUND OF THE INVENTION

This invention has application in systems involving the transfer of material, and particularly those wherein such material is transported from a storage area to an ultimate area of utilization. As an example, flour, or the ingredients thereof, may be stored in a central bin. It may need to be ultimately delivered to particular points of use, some distance away. Means of conveyance have been developed for withdrawing the flour from the bin, or other container, and transporting it by pneumatic means, or the like, to further hoppers at the time and in the quantity desired. Normally, one or more motors have served as the power source for withdrawing the material from the supply source, and for propelling such material by means of an airstream. Past devices have oftentimes used unidirectional motors coupled with elaborate and bulky valve systems to adapt a conduit system for both purposes. Examples of prior art systems include the following U.S. Pat. Nos.: 3,195,746; 3,373,883; 2,565,946; and 2,663,594. Not only has industry long desired more compact and efficient conveying systems, such as that taught hereinafter, but also, this device may also perform as an effective cleaner in bulk operations.

DESCRIPTION OF THE DRAWINGS

FIG. 1 is a side elevation of the conveyor; and
FIG. 2 is a plan view thereof, a portion of the cover being broken away for ease of illustration.

DESCRIPTION OF A PREFERRED EMBODIMENT

Looking at the drawings, a vessel 10 for containing material, such as flour or the like, is shown to have a generally conical hollow portion 11 centrally of the vessel. Head or cover 12 may be linked thereto by bolts 13 passing through adjacent flanges of the two vessel parts. Conical portion 11 may be generally rounded off at one end, or, as depicted in FIG. 1, be fitted at its lower end with hollow cylindrical extension 14. Thus, portions 11, 12 and 14 combine to form a pressure-controlled vessel, into which particulate material may be supplied, and from which such material may be exhausted. Such material may come from an outside storage bin, tank car or the like, not shown on the accompanying drawings. An inlet opening and fitting 15, is shown near the top of conical portion 11. Filters 65 of a number of convenient and well-known types may be fitted within vessel 10, preferably extending across the entire planar junction between central portion 11 and cover 12. Such filters prevent the deposited particulates from exiting the vessel through the cover fittings later described. A conduit would be joined in a pressuretight manner to such fitting as well as to the particular supply bin being utilized. The vessel, and related equipment, may be mounted on a wheeled, or otherwise mobile, frame generally designated by the numeral 20.

Operation of this particular conveyor is governed principally by motor 30 and related blower 40. These members are only shown in a general manner, inasmuch as motor-blower combinations, as such, are not new. The motor output shaft may be linked to the blower member by a belt and pulley arrangement, as shown in FIG. 1. It is not new to be able to supply material to, or withdraw it from a vessel, by virtue of a motor-blower combination. Normally, valve members are positioned within or conjunctive to the conduit system linking the blower to the vessel. This is necessary in order to reverse the particular function of a particular conduit section, i.e., reverse the conduit connection from the vacuum end of the blower to the pressure end. Such valve systems have become bulky, expensive and often required laborious and expensive maintenance. Although reversible motors are not new as such, it is felt that utilization of such a motor, i.e., one whose direction of output shaft rotation may be controlled, permits novel operation of this conveying system.

Here, blower 40 has opposed openings. One would be connected to conduit 41, which conduit might include silencer 42. One end of this conduit is opened to the atmosphere, the other being linked to the blower. Connected to the other side of the blower is additional pipe fitting 43, shown in FIG. 1 to extend vertically therefrom. Such fitting branches into conduits 44, 45, the former extending laterally around vessel portion 11, and the former entering within the pressure vessel through an appropriate fitting provided cover portion 12. Conduit 45 includes valve member 45–V. This valve is open in the direction of the arrow. In the opposite direction, the valve is closed except for bleeder holes which permit the passage of a relatively small quantity of air or other motivating fluid.

Forwardly of vessel portion 11, member 44, by a T-fitting, branches into plural conduits 46 and 47. Member 46 includes valve member 46–V, and enters vessel extension 14 through an appropriate pressuretight fitting, not shown. Conduit member 47 includes valve 47–V, and enters discharge pipe 48. This discharge member 48, leads from the underside of the pressure vessel to the line, fitting 49 being utilized to connect such conduit to the line. Valve member 46–V is a one-way valve in the direction of the arrow. Butterfly valve 47–V is governed by diaphragm 51, which, by virtue of a pressure tap (not shown), opens the valve to permit air to enter directly into the line on a pressure buildup. Such a buildup normally indicates a clogging of the conveyed material. Direct insertion of the conveying air medium will normally remedy the situation. Rod means 52 may be the means utilized by diaphragm to open valve 47–V. In the absence of such unduly high pressure, valve 47–V remains closed.

Within the confines of the pressure vessel, near cover 12 thereof, filters 65 are provided to prevent the transported material from entering conduit 45 and the blower. Also provided is a level indicator 55, which may be of the type shown in U.S. application, Ser. No. 681,229, filed Nov. 7, 1967, which is able to detect the level or height of material carried by a storage bin. Such indicator is connected to control panel 60 by cable or conduit means 56, to permit the control panel to electrically activate certain control apparatus. A like connector 57 joins the control panel to the conduit system, and particularly to member 43, thereof.

Consider now the operation of this conveyor. Assume that on initiation of the operation, it is desired to fill the vessel from some outside source. Proper tubing, or the like, would connect such source to inlet fitting 15. Indicator means on the control panel 60 would indicate that the vessel needs filling. Activation of a switch on the panel, assuming a power source, would activate the filling cycle. Motor 30, linked to panel with panel, would cause blower to become operable. Conduit 41 would discharge into the atmosphere, while a vacuum would be created within the system defined by the supply bin, tubing leading to the pressure vessel, fitting 15, and within the interior of members 11, 12 and 14, thus depositing the particulate matter from the supply container to member 10. The air-conveying medium would pass upward within vessel 10, through the filters 65, which block passage of the particulate, the air continuing through pipe 45, valve 45–V, member 43, blower 40 and exit through conduit 41. Eventually, the material deposited within vessel 10 reaches the level controlled by by indicator 55. This results in the activation of a switch on the control panel for changing the operation from one of filling to one of discharge. Eventual return to the filling cycle is a function of the pressure within the system, i.e., when the last material is discharged there is a significant pressure drop which, on detection, causes reinstigation of the fill cycle. Connection 57 may provide the control panel with such a reading from the system. On switching from "fill" to "discharge" some time is necessary to build up pressure within the system. Thus, when level indicator 55 causes activation of the discharge cycle, there is a built-in time delay switch (some 20 seconds having been found acceptable) which prevents a low-pressure reading from reactivating the fill cycle. In any case, on such discharge activation, the motor direction is reversed, air is drawn in through member 41, the blower 40 then causing such conveying medium to enter the system. A small portion of such air will pass upward through conduit 45 and the small apertures in valve 45-V, down through cover 12. This air will tend to keep the stored material from building upon the underside of filters 65, as well as assist in conveying. Most of the air will pass through conduits 43, 44, 46 to enter vessel 10 through valve 46-V and convey the particulate out discharge conduit 48 into the line. Connector 47, valve 47-V and diaphragm 51 may be thought of as a useful assist. In the event of pressure buildup within the line, this will be sensed by said diaphragm by virtue of a probe (not shown) connecting the diaphragm to the system. On detecting such increase, it will cause valve 47-V to open, permitting air to pass directly into the line, removing the blockage and returning the pressure to normal, at which stage diaphragm closes valve 47-V. When vessel 10 is discharged, pressure drops, as mentioned. This information is detected and communicated, as through connector 57 (which may be a pressure-activated switch, for example) to the control panel, which reverses the motor, again causing the particulate material to be drawn into vessel 10 through inlet 15.

A further advantage of this simple reversible operation is that it may function in the manner of a vacuum cleaner, i.e., the hose joined to inlet 15 serving as the pickup mechanism. The reversal of operations by means of the motor reversal eliminates the requirement for a number of sometimes bulky valve or control devices. This enhances the mobility of the conveyor device described in the single embodiment herein depicted. Naturally, numerous modifications are possible without departing from the spirit of the invention, which, is described in the following claims:

We claim:

1. A particulate conveying system comprising a container for solid particulate material,
   filter means separating an upper portion of said container from a lower portion,
   a first fluid conduit in communication with the upper portion of said container,
   a second fluid conduit, a particulate material inlet and a particulate material outlet in communication with the lower portion of said container,
   said first fluid conduit including valve means allowing fluid flow outwardly from the container but inhibiting fluid flow inwardly thereto,
   said second fluid conduit including valve means allowing fluid flow inwardly to said container but preventing fluid flow outwardly therefrom,
   a reversible blower, and
   means connecting both said first and second fluid conduits to the same opening of said blower, whereby upon operation of said blower in one direction a vacuum is imposed in both of said first and second conduits, and upon operation of said blower in the other direction a pressure is imposed in both of said first and second conduits said valve means in the first fluid conduit has means to allow a small fluid flow into the container when said blower is operated in said other direction to provide air for cleaning said filter.

2. A particulate conveying system as defined by claim 1 and including
   control means connected to said blower to change its direction from vacuum to pressure upon filling of said container with particulate material to a predetermined level, and to change its direction from pressure to vacuum upon the substantial emptying of said container of particulate material.

3. A particulate conveying system as defined by claim 2 wherein said control means includes
   a pressure switch which operates to switch the blower from pressure to vacuum in response to a drop in pressure in said container, and
   means for inactivating said pressure switch for a limited period of time immediately following the switch from vacuum to pressure.

4. A particulate conveying system as defined by claim 1 and including
   bypass means communicating between said second fluid conduit and said material outlet, and
   means for rendering the bypass inoperative.

* * * * *